United States Patent
Yadav et al.

(10) Patent No.: US 8,866,649 B2
(45) Date of Patent: Oct. 21, 2014

(54) METHOD AND SYSTEM FOR USING NON-VARIABLE COMPRESSION GROUP SIZE IN PARTIAL CLONING

(75) Inventors: Sandeep Yadav, Santa Clara, CA (US); Dnyaneshwar Pawar, Bangalore (IN); Anand Natarajan, Santa Clara, CA (US)

(73) Assignee: Netapp, Inc., Sunnyvale, CA (US)

( * ) Notice: Subject to any disclaimer, the term of this patent is extended or adjusted under 35 U.S.C. 154(b) by 513 days.

(21) Appl. No.: 13/232,216

(22) Filed: Sep. 14, 2011

(65) Prior Publication Data

US 2013/0067175 A1    Mar. 14, 2013

(51) Int. Cl.
*H03M 7/00* (2006.01)
*G06F 12/00* (2006.01)
*G06F 11/14* (2006.01)

(52) U.S. Cl.
CPC ............ *G06F 12/00* (2013.01); *G06F 11/1448* (2013.01); *G06F 11/1453* (2013.01)
USPC ................. 341/67; 341/96; 341/88; 711/162; 707/693; 714/4.11; 710/68; 708/203; 709/247

(58) Field of Classification Search
CPC ..... H03M 7/40; H03M 5/145; H03M 7/4093; G06F 3/065; G06F 11/1469
USPC ................. 341/67, 96, 88; 711/162; 707/693; 714/4.11; 710/68; 708/203; 709/247
See application file for complete search history.

(56) References Cited

U.S. PATENT DOCUMENTS

| | | | |
|---|---|---|---|
| 6,594,743 B1 * | 7/2003 | Chen et al. ..................... | 711/162 |
| 7,689,630 B1 * | 3/2010 | Lam .............................. | 707/802 |
| 7,756,833 B2 * | 7/2010 | Van Ingen et al. ............ | 707/640 |
| 2003/0149793 A1 * | 8/2003 | Bannoura et al. ............. | 709/247 |
| 2006/0181441 A1 * | 8/2006 | Fallon .............................. | 341/87 |
| 2006/0244639 A1 * | 11/2006 | Parker ............................. | 341/51 |
| 2009/0204650 A1 * | 8/2009 | Wong et al. ................... | 707/204 |
| 2010/0079314 A1 | 4/2010 | Gonion | |
| 2010/0228709 A1 * | 9/2010 | Ahmed et al. ................ | 707/705 |

OTHER PUBLICATIONS

International Search Report on corresponding PCT application (PCT/US2012/055372) from International Searching Authority (USPTO) dated Nov. 13, 2012.
Written Opinion on corresponding PCT application (PCT/US2012/055372) from International Searching Authority (USPTO) dated Nov. 13, 2012.

* cited by examiner

*Primary Examiner* — Hong Kim
(74) *Attorney, Agent, or Firm* — Klein, O'Neill & Singh, LLP

(57) ABSTRACT

Method and system for partially cloning a data container with compression is provided. A storage operating system determines if a portion of a source data container that is to be cloned includes a plurality of compressed blocks that are compressed using a non-variable compression group size. The operating system clones the plurality compressed blocks with the non-variable compression group size and de-compresses a plurality of blocks of the data container that are not within the non-variable compression group size. The plurality of compressed blocks and the plurality of blocks that are not within the non-variable compression group size are then stored as a partially cloned copy of the source data container.

20 Claims, 8 Drawing Sheets

METHOD AND SYSTEM FOR USING NON-VARIABLE COMPRESSION GROUP SIZE IN PARTIAL CLONING

TECHNICAL FIELD

The present disclosure relates to storage systems.

BACKGROUND

A storage system typically comprises one or more storage devices where information may be entered, and from which information may be obtained, as desired. The storage system typically includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a storage device directly attached to a user or host computer. Storage of information is preferably implemented as one or more storage "volumes" of physical disks, defining an overall logical arrangement of storage space.

A storage system typically stores information at a storage array, which may then be replicated and archived for disaster recovery or any other reason. The replication process is commonly referred to as a "backup" operation.

The storage system typically uses a non-variable compression size for compressing information stored at the storage devices. This approach is efficient when an entire data container is cloned. If the data container is partially cloned, then the non-variable compression group size may not be very efficient because one has to decompress all the data blocks within the portion of the data container that is cloned and use the non-variable compression group size to compress the portion of the data container. Continuous efforts are being to improve partial cloning with compression.

SUMMARY

In one embodiment, a method and system for partially replicating a data container with compression is provided. A storage operating system determines if a portion of a source data container that is to be cloned includes a plurality of compressed blocks that are compressed using a non-variable compression group size. The operating system replicates the plurality of compressed blocks with the non-variable compression group size and de-compresses a plurality of blocks of the data container that are not within the non-variable compression group size. The plurality of compressed blocks and the plurality of blocks that are not within the non-variable compression group size are then stored as a partially cloned copy of the source data container.

In another embodiment, a machine implemented method for cloning a data container having some blocks within a non-variable compression group size and a block that is not within the non-variable compression group size is provided. The method includes determining a plurality of compressed blocks that are compressed using the non-variable compression group size; cloning the plurality of compressed blocks with the non-variable compression group size; decompressing a plurality of blocks of the data container that are not within the non-variable compression group size; and storing the plurality of compressed blocks and the plurality of blocks that are not within the non-variable compression group size as a partially cloned portion of the data container.

In yet another embodiment, a machine implemented method for cloning a data container is provided. The method includes scanning a source data container for generating a cloned copy of a portion of the source data container. The portion of the source data container includes a plurality of blocks that are compressed using a non-variable compression group size and at least one block that is not within the non-variable compression group size.

The method further includes reading the at least one block from the source data container; and generating the cloned copy of the portion of the source data container with the at least one block and the plurality of blocks that are compressed using the non-variable compression group size.

In another embodiment, a system is provided. The system includes a first computing system interfacing with a storage system having a hardware processor executing instructions for maintaining a plurality of data containers at a storage device. The processor scans a source data container for generating a cloned copy of a portion of the data container, where the portion of the source data container includes a plurality of blocks that are compressed using a non-variable compression group size and at least one block that is not within the non-variable compression group size; reads the at least one block from the source data container; and generates the cloned copy of the portion of the data container with the at least one block and the plurality of blocks that are compressed using the non-variable compression group size.

In yet another embodiment, a computer program product is provided. The computer program product includes a computer usable storage medium having computer readable instructions embodied therein for cloning a data container having some blocks within a non-variable compression group size and a block that is not within the non-variable compression group size. The computer readable instructions include instructions for determining a plurality of compressed blocks that are compressed using the non-variable compression group size for cloning a portion of a data container; instructions for cloning the plurality of compressed blocks with the non-variable compression group size; instructions for de-compressing a plurality of blocks of the data container that are not within the non-variable compression group size; and instructions for storing the plurality of compressed blocks and the plurality of blocks that are not within the non-variable compression group size as a partially cloned portion of the data container.

The embodiments disclosed herein have advantages because a user is allowed to take advantage of both partial cloning and compression.

This brief summary has been provided so that the nature of this disclosure may be understood quickly. A more complete understanding of the disclosure can be obtained by reference to the following detailed description of the various embodiments thereof in connection with the attached drawings.

BRIEF DESCRIPTION OF THE DRAWINGS

The foregoing features and other features will now be described with reference to the drawings of the various embodiments. In the drawings, the same components have the same reference numerals. The illustrated embodiments are intended to illustrate, but not to limit the present disclosure. The drawings include the following Figures:

FIG. 4C shows an example of a source data container and a partial clone of the source data container;

DETAILED DESCRIPTION

As a preliminary note, the terms "component", "module", "system," and the like as used in this disclosure are intended to refer to a computer-related entity, either programmable instructions-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick, flash memory device or any other non-volatile memory device, or any other storage device, in accordance with the claimed subject matter.

In one embodiment, a method and system for partially replicating a data container with compression is provided. A storage operating system determines if a portion of a source data container that is to be cloned includes a plurality of compressed blocks that are compressed using a non-variable compression group size. The operating system replicates the plurality of compressed blocks with the non-variable compression group size and de-compresses a plurality of blocks of the data container that are not within the non-variable compression group size. The plurality of compressed blocks and the plurality of blocks that are not within the non-variable compression group size are then stored as a partially cloned copy of the source data container.

Figure 1:
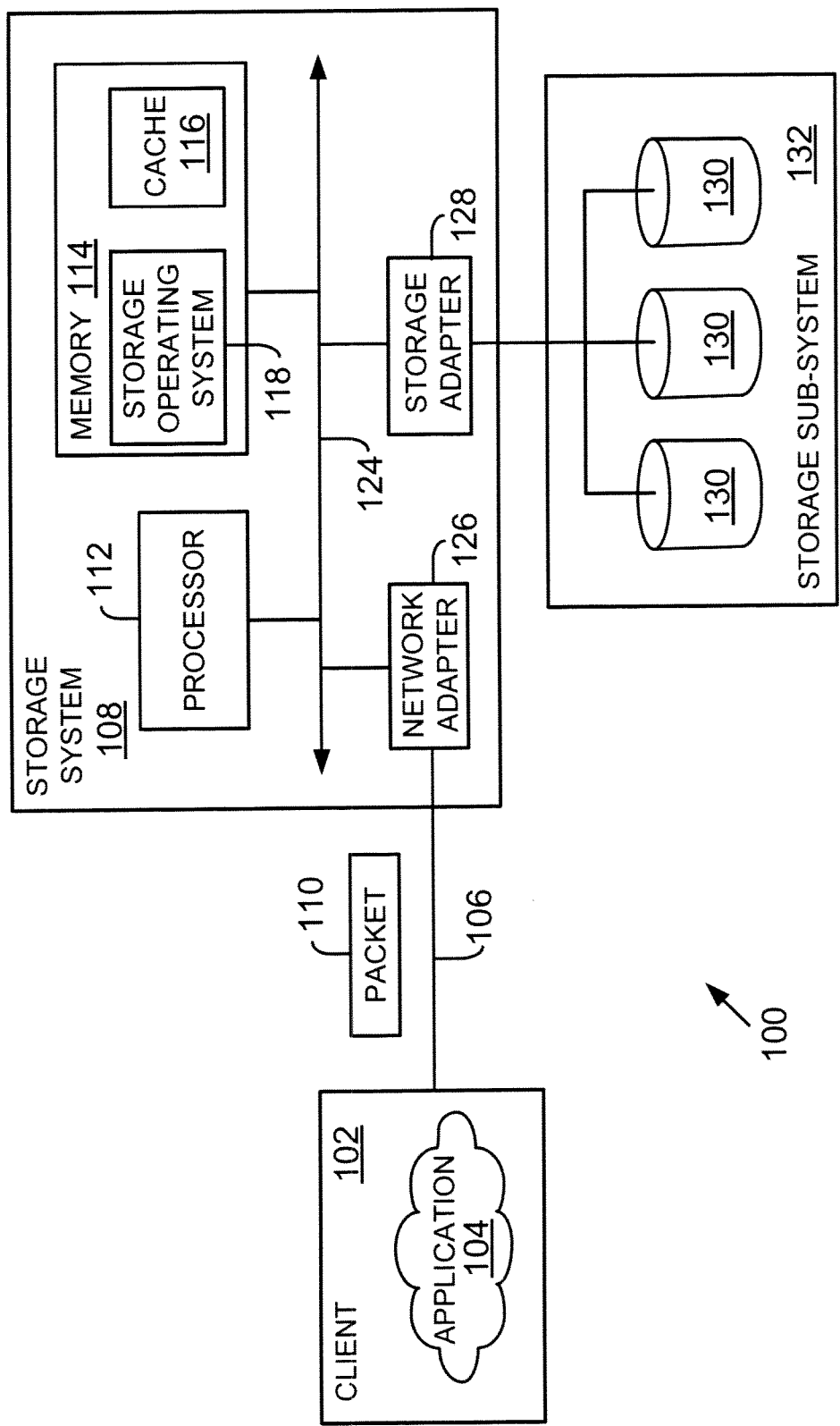
FIG. 1 shows a block diagram of a system using the embodiments disclosed herein.

FIG. 1 is a schematic block diagram of an operating environment 100 (also referred to as system 100) including a storage system 108 that may be advantageously used with the present disclosure. System 100 is used to store one or more data containers, for example, directories, files, structured and unstructured data. The data containers may then be partially cloned using a variable and non-variable compression size, as described below in detail.

The storage system 108 may be one or more computing system that provides storage services relating to organization of information at storage devices, such as storage devices 130 of a storage sub-system 132. Storage devices 130 may be, for example, tape drives, conventional magnetic disks, optical disks such as CD-ROM or DVD based storage, magneto-optical (MO) storage, flash memory storage device or any other type of storage device suitable for storing data. The examples disclosed herein may reference a storage device as a "disk drive" but the adaptive embodiments disclosed herein are not limited to any particular type of storage media/device.

The storage system 108 comprises one or more processor 112 (also referred to as a central processing unit), a memory 114, a network adapter 126 and a storage adapter 128 interconnected by an interconnect system (or bus system) 124. Processor 112 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices. The bus system 124, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The storage system 108 also includes a storage operating system 118 that preferably implements a high-level module, such as a file system, to logically organize the information as a hierarchical structure of data containers on storage devices 130.

In the illustrative embodiment, memory 114 comprises storage locations that are addressable by processor 112 and other modules, for example, storage adapter 128 and network adapter 126) for storing machine executable instructions. A portion of the memory may be further organized as a "cache" 116 for storing data structures associated with the present disclosure.

Storage operating systems 118, portions of which are typically resident in memory and executed by the processing elements, functionally organizes the system 108 by, inter alia, invoking storage operations executed by the storage system. It will be apparent to those skilled in the art that other processing and memory means, including various computer readable media, may be used for storing and executing program instructions pertaining to the inventive technique described herein.

The network adapter 126 includes mechanical, electrical and signaling circuitry needed to connect the storage system 108 to one or more client systems 102 (shown as client 102) over a connection system 106 (also referred to as network 106), which may comprise a point-to-point connection or a shared medium, such as a local area network. Illustratively, connection system 106 may be embodied as an Ethernet network or a Fibre Channel (FC) network. The client 102 may communicate with the storage system over network 106 by exchanging discrete frames or packets of data according to pre-defined protocols, such as the Transmission Control Protocol/Internet Protocol (TCP/IP).

Client 102 may be a general-purpose computer configured to execute processor executable applications 104. Moreover, client 102 may interact with the storage system 108 in accordance with a client/server model of information delivery. That is, the client may request the services of the storage system, and the system may return the results of the services requested by the client, by exchanging packets 110 over the network 106. The clients may issue packets including file-based access protocols, such as the Common Internet File System (CIFS) protocol or Network File System (NFS) protocol, over TCP/IP when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

The storage adapter 128 cooperates with the storage operating system 118 executing on the system 108 to access information requested by a user (or client). The storage adapter includes input/output (I/O) interface circuitry that couples to the storage devices over an I/O interconnect arrangement, such as a conventional high-performance, FC serial link topology.

Storage system 108 presents storage volumes to clients for reading and writing data. The term storage volume or volume as used herein means a logical data set which is an abstraction of physical storage, combining one or more physical mass storage devices or parts thereof into a single logical storage object. However, each storage volume can represent the storage space in one storage device, an aggregate of some or all of the storage space in multiple storage devices, a RAID group, or any other set of storage space.

A storage volume is typically a collection of physical storage devices 130 cooperating to define an overall logical arrangement of volume block number (vbn) space on the volume(s). Each logical volume is generally, although not necessarily, associated with its own file system. The storage devices within a logical volume/file system are typically organized as one or more groups, wherein each group may be operated as a Redundant Array of Independent (or Inexpensive) Disks (RAID).

To facilitate access to the storage devices 130, in one embodiment, the storage operating system 118 implements a write-anywhere file system. The file system logically organizes information as a hierarchical structure of named data containers, e.g. directories and files. Each "on-disk" data container may be implemented as set of blocks configured to store information, such as data, whereas the directory may be implemented as a specially formatted data container in which names and links to other data containers and directories are stored. The blocks at storage devices 130 may be exported as named logical unit numbers (luns).

In the illustrative embodiment, the storage operating system is preferably the NetApp® Data ONTAP™ operating system available from NetApp, Inc., Sunnyvale, Calif. that implements a Write Anywhere File Layout (WAFL™) file system. However, it is expressly contemplated that any appropriate storage operating system may be enhanced for use in accordance with the inventive principles described herein. As such, where the term "WAFL" is employed, it should be taken broadly to refer to any storage operating system that is otherwise adaptable to the teachings of this disclosure.

Although storage system 108 is shown as a stand-alone system, i.e. a non-cluster based system, in another embodiment, storage system 108 may have a distributed architecture that may include, for example, a separate N-("network") blade and D-(disk) blade. Briefly, the N-blade is used to communicate with client 102, while the D-blade is used to communicate with the storage devices 130 that are a part of a storage sub-system. The N-blade and D-blade may communicate with each other using an internal protocol.

Alternatively, storage system 108 may have an integrated architecture, where the network and data components are all contained in a single box. The storage system 108 further may be coupled through a switching fabric to other similar storage systems (not shown) which have their own local storage subsystems. In this way, all of the storage subsystems can form a single storage pool, to which any client of any of the storage servers has access.

Figure 2:
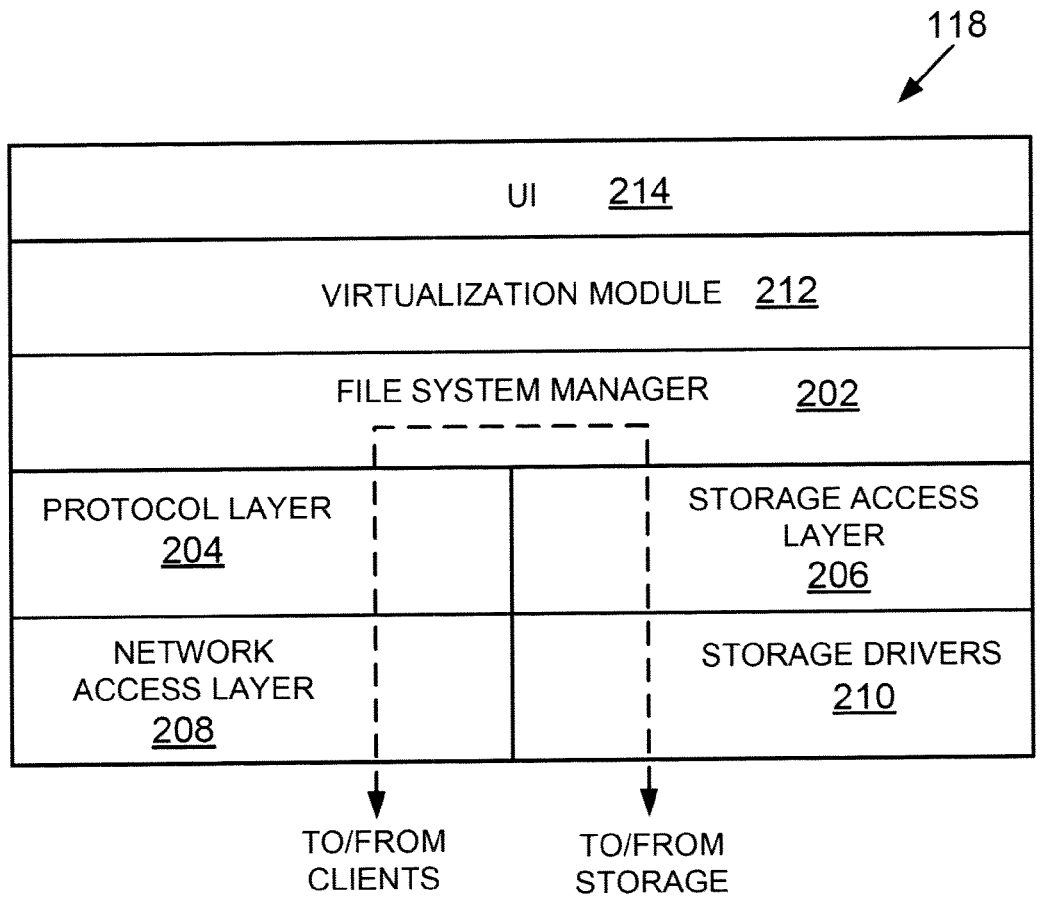
FIG. 2 shows an example of a storage operating system, used according to one embodiment.

FIG. 2 illustrates a generic example of a storage operating system 118, according to one embodiment of the present disclosure. The storage operating system 118 manages a plurality of data containers as described below in more detail. The data containers may be partially cloned using a variable compression group size and a non-variable compression group size, as described below in more detail.

In one example, operating system 118 may include several modules, or "layers". These layers include a file system manager 202 that keeps track of a directory structure (hierarchy) of the data stored in storage devices and manages read/write operations, i.e., executes read/write operations on storage devices 130.

Operating system 118 may also include a protocol layer 204 and an associated network access layer 208, to allow storage system 108 to communicate over a network with other systems, for example, client 102. Protocol layer 204 may implement one or more of various higher-level network protocols, such as Hypertext Transfer Protocol (HTTP), TCP/IP and others, as described below.

Network access layer 208 may include one or more drivers, which implement one or more lower-level protocols to communicate over the network, such as Ethernet. Interactions between client 102 and mass storage devices 130 are illustrated schematically as a path, which illustrates the flow of data through operating system 118.

The operating system 118 may also include a storage access layer 206 and an associated storage driver layer 210 to communicate with a storage device, for example, 130. The storage access layer 206 may implement a higher-level storage protocol, such as RAID, while the storage driver layer 210 may implement a lower-level storage device access protocol, such as SCSI.

File system manager 302 may include or interface with the various components of system 100 that have been described above in detail with respect to FIG. 1. File system 202 interfaces with or includes a virtualization module 212 to enable access via a user interface (UI) 214, to a user (system administrator) issuing commands to the storage system 108. UI 214 is disposed over the storage operating system in a manner that enables administrative or user access to the various layers and systems.

It should be noted that the software "path" through the operating system layers described above may alternatively be implemented in hardware or a combination of hardware and software. That is, in an alternate embodiment of the disclosure, the storage access request data path may be implemented as logic circuitry embodied within a field programmable gate array (FPGA) or an ASIC.

As used herein, the term "storage operating system" generally refers to the computer-executable code operable on a computer to perform a storage function that manages data access and may implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the disclosure described herein may apply to any type of special-purpose (e.g., file server, filer or storage serving appliance) or general-purpose computer, including a standalone computer or portion thereof, embodied as or including a storage system. Moreover, the teachings of this disclosure can be adapted to a variety of storage system architectures including, but not limited to, a network-attached storage environment, a storage area network and a storage device directly-attached to a client or host computer. The term "storage system" should therefore be taken broadly to include such arrangements in addition to any subsystems configured to perform a storage function and associated with other equipment or systems.

The file system is illustratively a message-based system that provides logical volume management capabilities for use in access to the information stored at the storage devices 130. That is, in addition to providing file system semantics, the file system 202 provides functions normally associated with a volume manager. These functions include (i) aggregation of storage devices, (ii) aggregation of storage bandwidth of the storage devices, and (iii) reliability guarantees, such as mirroring and/or parity (RAID).

In one embodiment, the file system 202 illustratively implements the WAFL file system having an on-disk format representation that is block-based using, e.g., 4 kilobyte (kB) blocks and using index nodes ("inodes") to identify data containers and data container attributes (such as creation time, access permissions, size and block location). The file system 202 uses data containers (metadata files) to store metadata describing the layout of its file system. These metadata files include, among others, an inode having a file handle, an identifier that includes an inode number used to retrieve the inode from a storage location.

Broadly stated, all inodes of the write-anywhere file system are organized into the inode data container. A file system (FS) information block specifies the layout of information in the file system and includes an inode of a data container that includes all other inodes of the file system. Each logical volume (file system) has an FS information block that is preferably stored at a fixed location within, e.g., a RAID group. The inode of the root FS information block may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a data container.

Operationally, a request from the client 102 is forwarded as a packet 110 over the computer network 1106 and onto the storage system 108 where it is received at the network adapter 126. A network driver (of layer 208) processes the packet and, if appropriate, passes it on to a network protocol and file access layer for additional processing prior to forwarding to the write-anywhere file system 202. Here, the file system generates operations to load (retrieve) the requested data from storage device 130 if it is not resident "in core", i.e., in cache 116. If the information is not in the cache, the file system 202 indexes into the inode data container using the inode number to access an appropriate entry and retrieve a logical vbn. The file system then passes a message structure including the logical vbn to storage access layer 206. The logical vbn is mapped to a storage device identifier and disk block number (disk, dbn) and sent to the storage driver 210. The storage driver 210 accesses the dbn from the specified disk 130 and loads the requested data block(s) in cache 116 for processing by the storage system. Upon completion of the request, the storage system (and operating system) returns a reply to the client 102 over the network 106.

Figure 3:
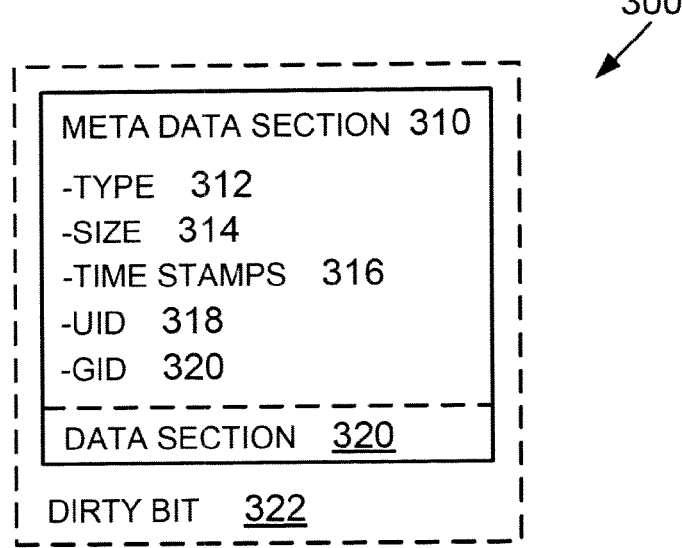
FIG. 3 shows an example of storing metadata for a data container.

In the illustrative embodiment, a data container is represented as an inode adapted for storage at storage device 130. Inode 300 may also be used for a partial clone generated according to one embodiment, as described below in more detail. FIG. 3 provides an example of an inode 300, which preferably includes a metadata section 310 and a data section 320. The information stored in the metadata section 310 of each inode 300 describes the data container and, as such, includes the type (e.g., regular, directory, virtual disk) 312 of data container, the size 314 of the data container, time stamps (e.g., access and/or modification) 316 for the data container and ownership, i.e., user identifier (UID 318) and group ID (GID 320). The contents of the data section 320 of each inode, however, may be interpreted differently depending upon the type of inode defined within the type field 312. For example, the data section 320 of a directory inode contains metadata controlled by the file system 202, whereas the data section of a regular inode contains file system data. In this latter case, the data section 320 includes a representation of the data associated with the data container.

Specifically, the data section 320 of a regular inode may include file system data or pointers, the latter referencing 4 kB data blocks to the storage device 130 used to store the file system data. Each pointer is preferably a logical vbn to facilitate efficiency among the file system 202 when accessing stored data. Given the restricted size (e.g., 128 bytes) of the inode, file system data having a size that is less than or equal to 64 bytes is represented, in its entirety, within the data section of that inode. However, if the file system data is greater than 64 bytes but less than or equal to 64 kB, then the data section of the inode (e.g., a first level inode) may comprise of various pointers (e.g. 16 pointers), each of which references a 4 kB block of data at storage device 130.

Moreover, if the size of the data is greater than 64 kB but less than or equal to 64 megabytes (MB), then each pointer in the data section 320 of the inode (e.g., a second level inode) references an indirect block (e.g., a first level block) that may include various pointers, for example, pointers, each of which references a 4 kB data block at storage devices 130. For file system data having a size greater than 64 MB, each pointer in the data section 320 of the inode (e.g., a third level inode) references a double-indirect block (e.g., a second level block) that may include various pointers, for example, 510 pointers, each referencing an indirect (e.g., a first level) block. The indirect block, in turn, that contains 510 pointers, each of which references a 4 kB data block on a storage device. When accessing a file, each block of the file may be loaded from storage device 130 into cache 116.

When an on-disk inode (or block) is loaded from storage device 130 into cache 116, its corresponding in core structure embeds the on-disk structure. For example, the dotted line surrounding the inode 300 (FIG. 3) indicates the in core representation of the on-disk inode structure. The in core structure is a block of memory that stores the on-disk structure plus additional information needed to manage data in the memory (but not on disk). The additional information may include, e.g., a "dirty" bit 322. After data in the inode (or block) is updated/modified as instructed by, e.g., a write operation, the modified data is marked "dirty" using the dirty bit 322 so that the inode (block) can be subsequently "flushed" (stored).

Figure 4A:
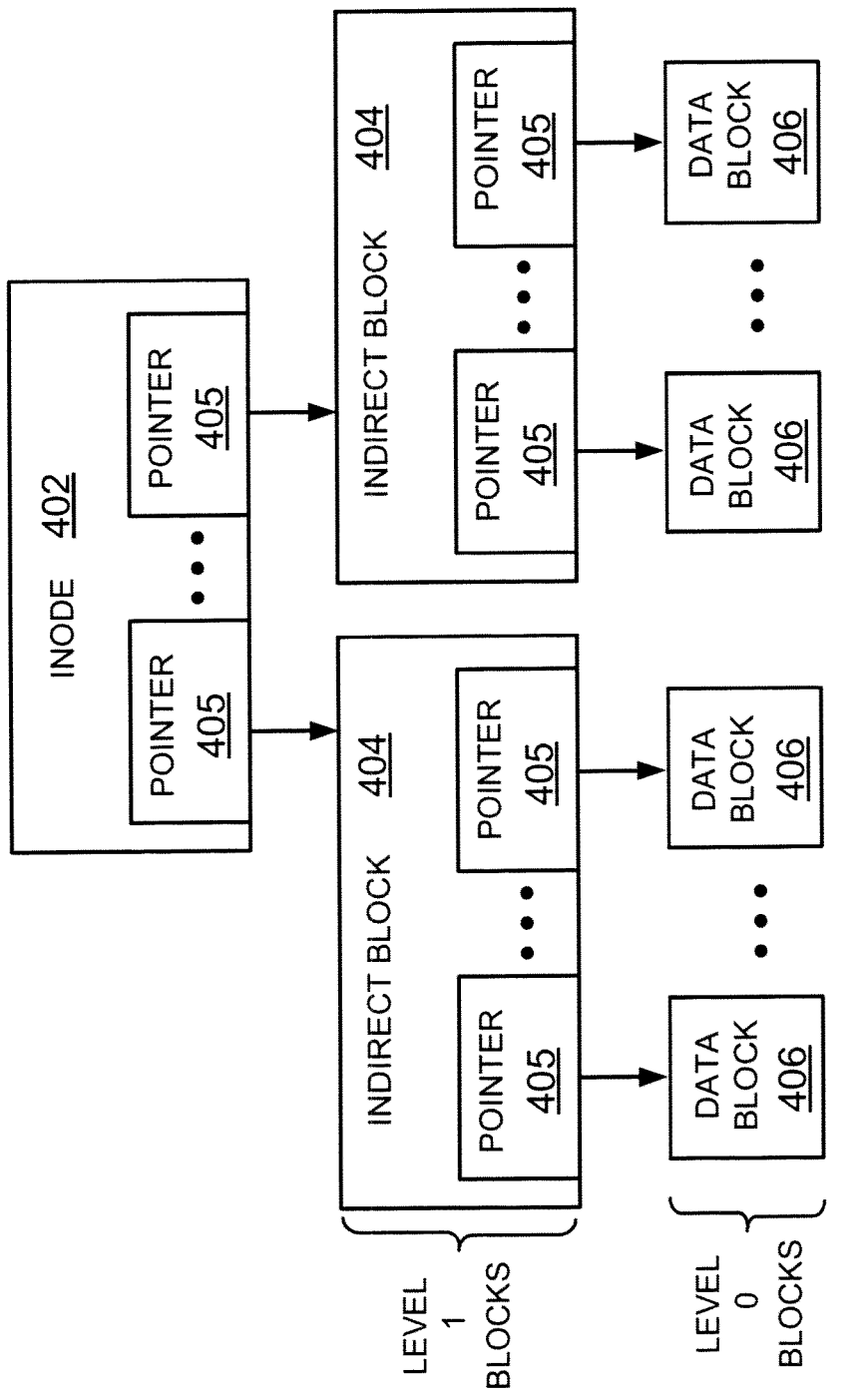
FIG. 4A shows a tree structure for a data container, according to one embodiment.

FIG. 4A is a schematic block diagram of a tree structure that may be advantageously used with the present disclosure for generating a partial clone of a data container using both non-variable and variable compression group sizes, as described below in more detail. The tree structure is an internal representation of blocks for a data container (e.g., file A 400) loaded into cache 116 and maintained by the file system 202. A root (top-level) inode 402, such as an embedded inode, references indirect (e.g., level 1) blocks 404. The indirect blocks (and inode) include pointers 405 that ultimately reference data blocks 406 used to store the actual data of file A. That is, the data of file A 400 is stored at the data blocks and the locations of these blocks are stored in the indirect blocks of the file.

Each level 1 indirect block 404 may include pointers to various blocks, for example, 510 data blocks. According to the "write anywhere" nature of the file system, these blocks may be located anywhere on storage devices 130.

Figure 4B:
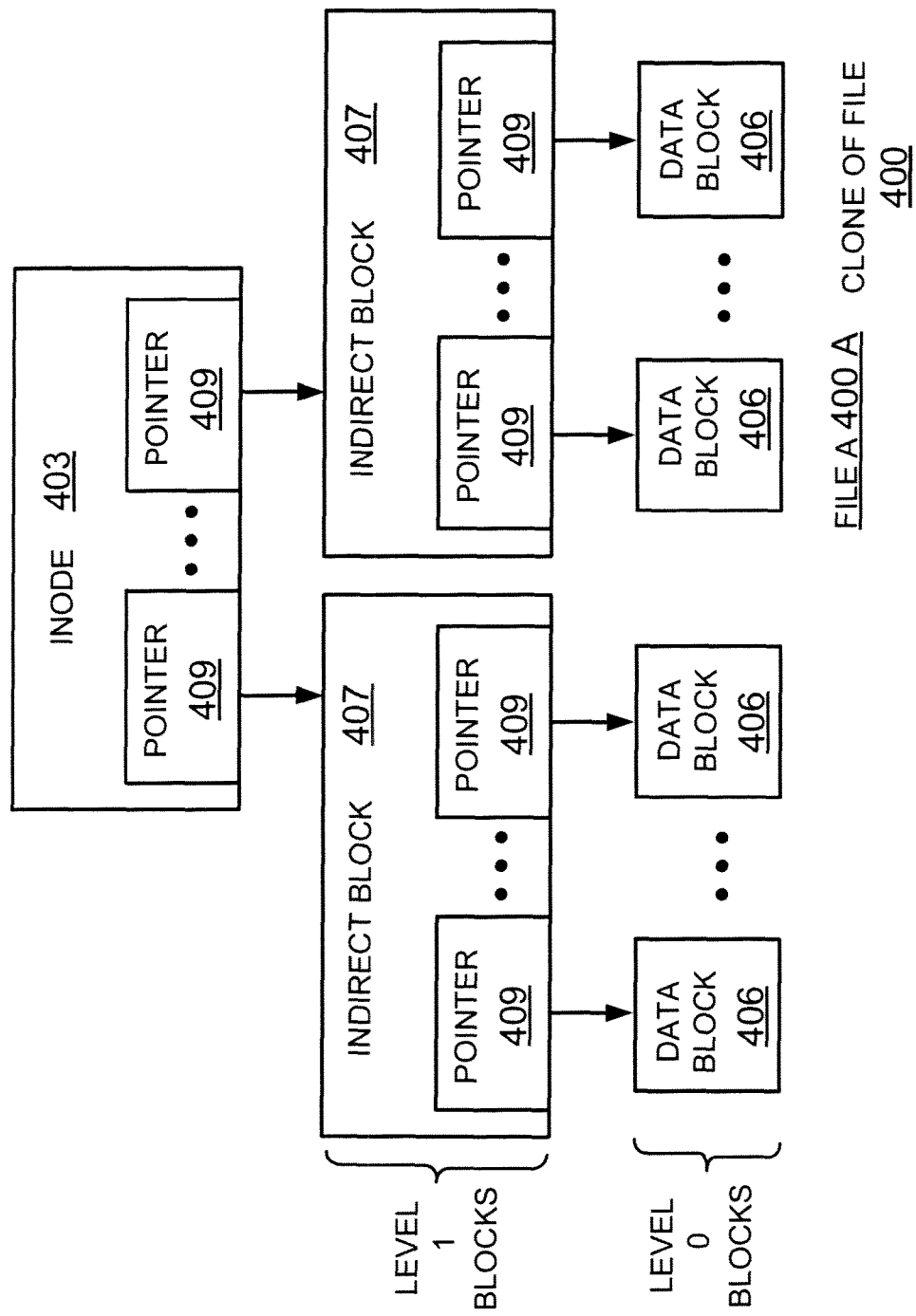
FIG. 4B shows an example of cloning the data container of FIG. 4A.

A storage administrator/user may want to "clone" the file system or portion thereof. To efficiently use storage space, often single instance storage (SIS) cloning technique is used. In SIS cloning, a new inode is created with new level 1 blocks, but the level 1 blocks point to the level 0 blocks of the original data container. An example of SIS cloning is provided in FIG. 4B where file 400A is a clone of file 400 of FIG. 4A.

Inode 403, similar to inode 402 is an independent structure with a plurality of indirect blocks 407, similar to 404. Pointers 409, similar to 405, point to the same data blocks 406 of FIG. 4A. Therefore, in the cloned copy, only a new inode 403 and the indirect level 1 blocks 407 are created. The original data at the level 0 data blocks remain the same. This technique efficiently uses storage space because the data blocks storing the actual data are not copied i.e. reading original level 0 data and writing as copied/new level 0 data, so avoiding unnecessary storage device input/output operations.

Storage systems may also use compression during cloning to save storage space. Since a large amount of data may be cloned, storage system 108 typically uses a non-variable compression group size to compress blocks. For example, storage system 108 may compress blocks of 8 as a group, rather than compressing individual blocks. This is efficient because it saves computing resources.

The use of non-variable compression group size is desirable in most situation but may not preferable for partial SIS cloning where portions of a data container/file system may be cloned. A description of partial SIS cloning is now provided below with respect to FIG. 4C.

Figure 4C:
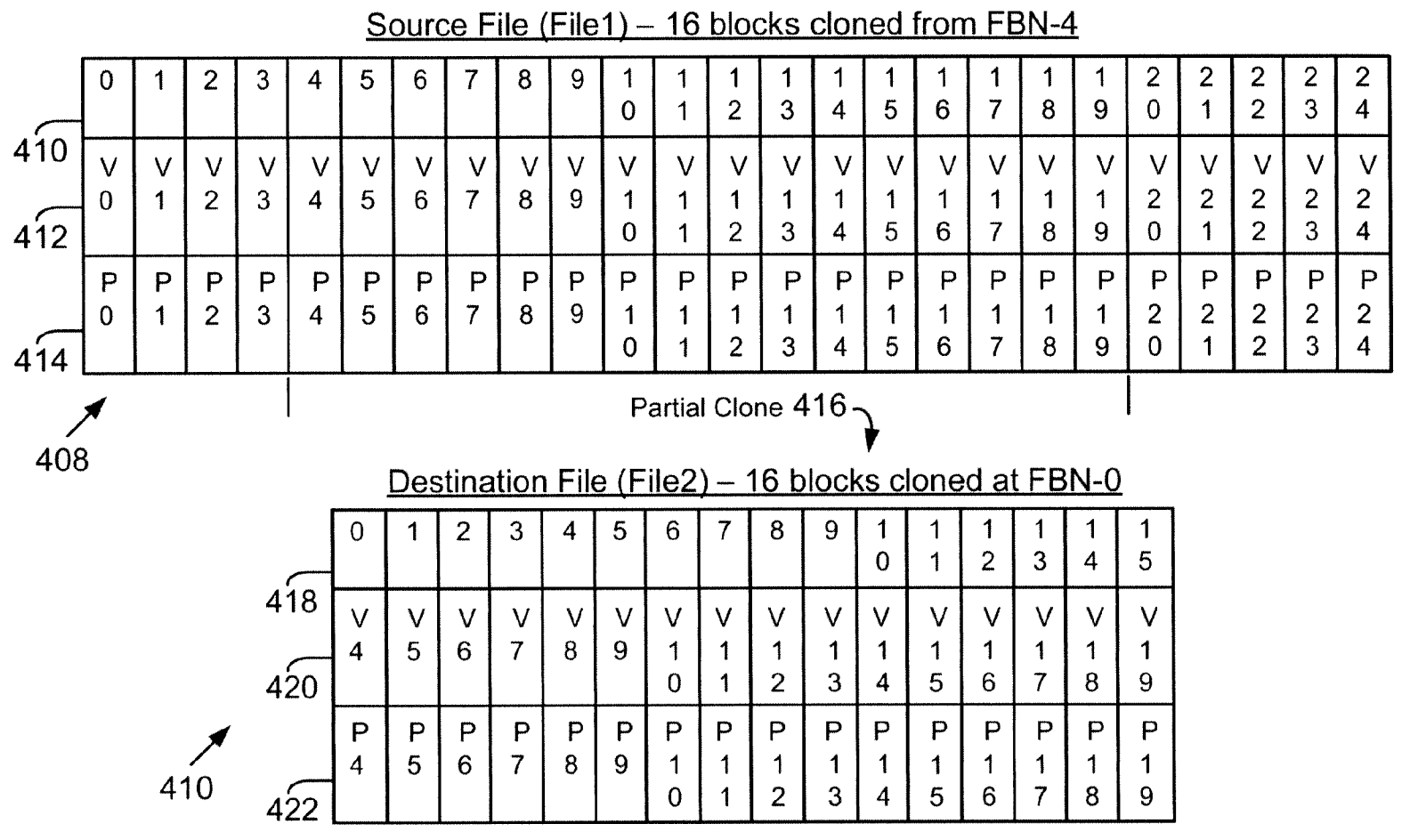

FIG. 4C shows a data container 408 having a file offset number starting from 0 to 24 shown in row 410. Row 412 shows the block numbers V0-V24 in a vbn space, while row 414 shows the physical storage space block numbers P0-P24 in the pbn space. The portion of data container 408 that is partially cloned is shown as 416.

In the cloned structure, row 418 shows the file offset starting from 0 to 15. Row 420 shows the new level 1 blocks, shown as V4-V19. The level 1 blocks of row 420 point to the pbn blocks of row 422. It is noteworthy that row 422 and row 414 blocks are the same.

If storage system 108 uses a non-variable compression group size, for example, 8, that starts with an offset "0", then storage system 108 first has to de-compress all the information for blocks shown in row 418. The storage system can then re-compress the blocks using the compression group size of 8 and then copy the compressed blocks into clone 416.

Figure 4D:
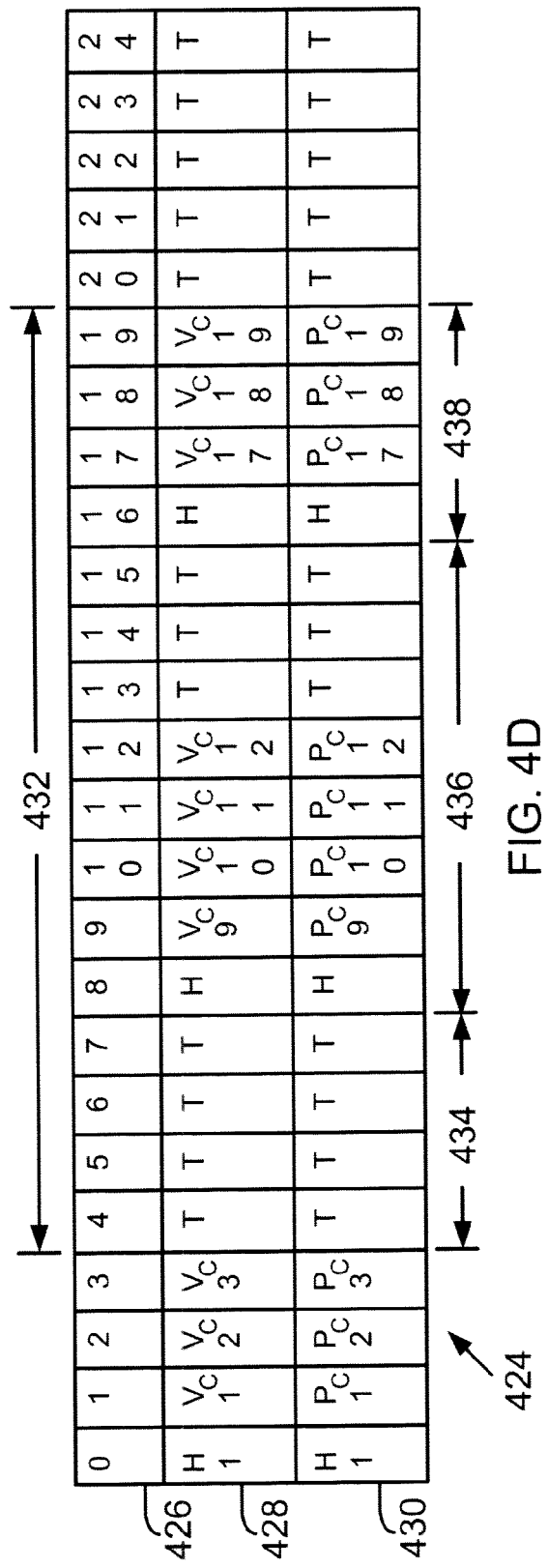
FIG. 4D shows a compressed data container.

The challenge with using non-variable compression group size in partial SIS cloning is shown in FIG. 4D, where data container 424 is the compressed version of data container 408 shown in FIG. 4C. Row 426 in FIG. 4D shows the block numbers 0-24. Eight blocks 0-7 of FIG. 4C are compressed into 3 blocks, shown in row 428 as Vc1, Vc2 and Vc3. Block H1 includes compression information for compressed blocks 0-7. The blocks labeled as "T" include padding information.

Row 430 includes the compressed blocks in the pbn space, shown as Pc1, Pc2 and Pc3, which means that P1-P7 of file 408 are compressed into Pc1, Pc2 Pc3. H1 in row 430 includes the compression information that is used by file system 202 to de-compress the stored information.

Blocks 8-15 are compressed into 4 blocks shown as Vc9-Vc12. The header for blocks 8-15 is shown as H in row 428. Similarly, blocks 16-23 of data container 408 are compressed using Vc17-Vc19. The header is used to store compression information.

For partial SIS cloning, only blocks 4-19 of row 426 shown as segment 432 are cloned, based on a user request. Since storage system 108 compressed the source data container 424 from offset 0, it has to de-compress all the blocks that are affected by the cloning, i.e. all the blocks within segment 432 are first de-compressed, then re-compressed, with block 4 of segment 426 as a starting offset and then copied for the partial SIS clone. Thus, using non-variable compression group size for partial SIS clones may not be very desirable.

In one embodiment, a variable compression group size and a non-variable compression group size is used for partial SIS clones. The partial group size is typically used for the number of blocks that precede or follow a fixed block location. For example, to partially clone segment 432, a variable compression size is used for segment 434 and 438, while the non-variable compression group size of the original source data container for segment 436 is maintained.

To clone blocks labeled 4, 5, 6 and 7 of row 426 in segment 434, file system 202 first de-compresses the blocks and then clones the de-compressed blocks. Similarly blocks labeled 16, 17, 18 and 19 are first de-compressed and then copied, like blocks 4, 5, 6 and 7.

The blocks labeled 8-15 in segment 436 however are not de-compressed and simply copied from the original compressed data container 424.

In one embodiment, blocks 4, 5, 6 and 7, as well as blocks 16, 17, 18 and 19 may be compressed in the cloned version with a variable block size of 4. Based on the foregoing example, segment 434 and 438 have a variable compression group size, while segment 436 maintains the original compression group size. This saves computing resources and space for a user that wants to use compression in partial SIS cloning.

Figure 4E:
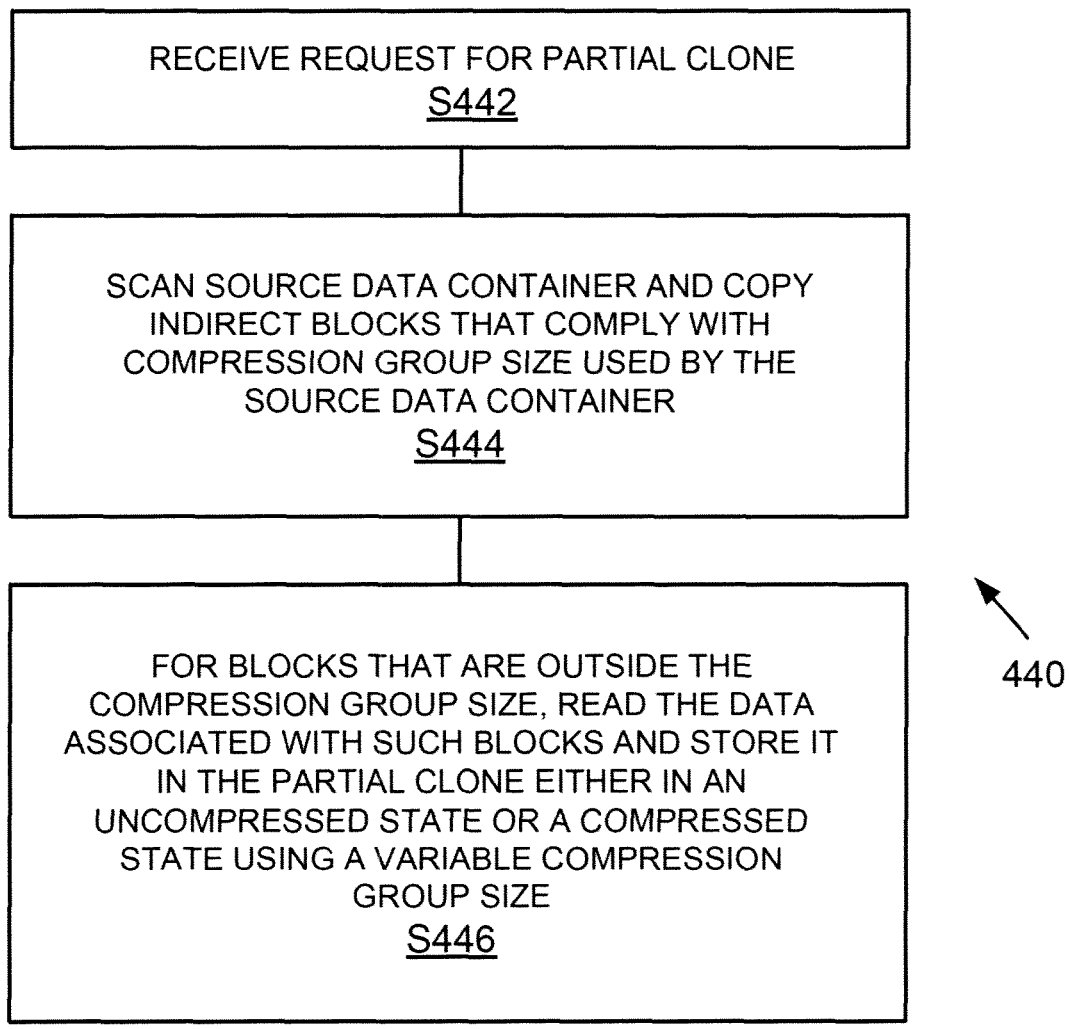
FIG. 4E shows a process flow diagram, according to one embodiment.

FIG. 4E shows a process flow diagram of a process 440 for using variable and non-variable compression group size, according to one embodiment. The process begins in block S442 when a request to partially clone a data container is received by storage operating system 118. The request identifies the data container and may be received via UI 214.

In block S444, the file system 202 retrieves the data container and determines if the starting offset for the partial clone matches with the starting offset of a compressed source data container. This means that the indirect blocks comply with a non-variable compression group size used to compress data container blocks. For example, referring to FIG. 4D, if the request is to partially clone blocks 0-15 of row 426, then file system 202 simply copies the blocks of row 428 into a cloned version because the starting offset for the partial cloning matches with the offset of the compressed blocks.

If the request for the partial clone does not match with the starting offset of a non-variable compression group size, then in block S446, file system 202 decompresses the source data container blocks and either stores the de-compressed blocks or compresses the decompressed blocks using a compression group size that is different from the default, non-variable compression group size, for example, 8. Referring back to FIG. 4D, if the partial clone request is for a block that starts in segment 434, then all the blocks within segment 434 are first read and then either copied or compressed using a block size of 4. The blocks within segment 436 are simply copied because they use the default compression group size. The blocks in segment 438 are handled similar to the blocks in segment 434.

The embodiments disclosed herein have advantages because a user is allowed to take advantage of both partial SIS cloning and compression.

Figure 5:
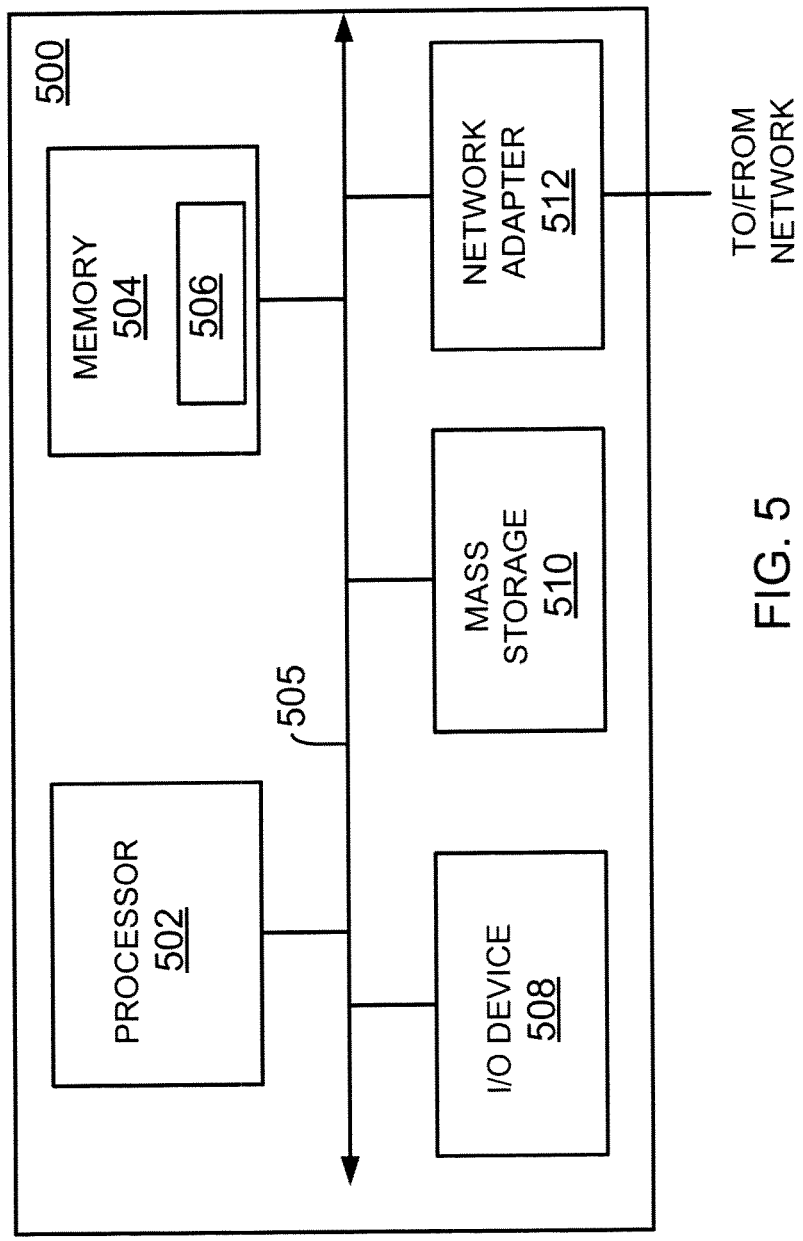
FIG. 5 shows a block diagram of a processing system, used according to one embodiment.

FIG. 5 is a high-level block diagram showing an example of the architecture of a processing system, at a high level, in which executable instructions for the process of FIG. 4E as described above, can be implemented. The processing system 500 can represent client system 102. Note that certain standard and well-known components which are not germane to the present disclosure are not shown in FIG. 5.

The processing system 500 includes one or more processors 502 and memory 504, coupled to a bus system 505. The bus system 505 shown in FIG. 4 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 502 are the central processing units (CPUs) of the processing system 500 and, thus, control its overall operation. In certain embodiments, the processors 502 accomplish this by executing programmable instructions 506 stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random access memory (RAM), read-only memory (ROM), flash memory, or the like, or a combination of such devices. Memory 504 includes the main memory of the processing system 500. Instructions 506 which implements the process steps of FIG. 4E may reside in and may be executed (by processors 502) from memory 504.

Also connected to the processors 502 through the bus system 505 are one or more internal mass storage devices 510, and a network adapter 512. Internal mass storage devices 510 may be or may include any conventional medium for storing large volumes of data in a non-volatile manner, such as one or more magnetic or optical based disks. The network adapter 512 provides the processing system 500 with the ability to communicate with remote devices over a network and may be, for example, an Ethernet adapter, a Fibre Channel adapter, or the like. The processing system 500 also includes one or more input/output (I/O) devices 508 coupled to the bus system 505. The I/O devices 508 may include, for example, a display device, a keyboard, a mouse, etc.

Cloud Computing: The system and techniques described above are applicable and useful in the upcoming cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud.

After the application layer is a cloud platform and cloud infrastructure followed by a "server" layer that includes hardware and computer software designed for cloud specific services. Details regarding these layers are not germane to the inventive embodiments. The storage systems described above can be a part of the server layer for providing storage services.

Thus, a method and apparatus for using variable and non-variable size compression groups in partial SIS cloning is provided. Note that references throughout this specification to "one embodiment" or "an embodiment" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the disclosure, as will be recognized by those of ordinary skill in the art.

While the present disclosure is described above with respect to what is currently considered its preferred embodiments, it is to be understood that the disclosure is not limited to that described above. To the contrary, the disclosure is intended to cover various modifications and equivalent arrangements within the spirit and scope of the appended claims.

What is claimed is:

1. A machine implemented method for partially cloning a data container, comprising:

determining a compressed block compressed using a non-variable compression group size;

cloning the compressed block using the non-variable compression group size without having to de-compress the compressed block;

de-compressing a block of the data container that is outside the non-variable compression group size; and storing the cloned compressed block and the decompressed block that is not within the non-variable compression group size as a partially cloned portion of the data container.

2. The method of claim 1, wherein the de-compressed block is compressed before being stored as part of the partially cloned portion of the data containers.

3. The method of claim 1, wherein the data container is stored in a hierarchical structure by a processor executable storage operating system.

4. The method of claim 3, wherein the hierarchical structure includes a first data structure identifying the data container, a second data structure associated with the first data structure, the second data structure storing address pointers to a third data structure that stores block numbers associated with physical storage space of a storage device.

5. The method of claim 1, wherein the non-variable compression group size is at least eight blocks.

6. A machine implemented method for cloning a data container, comprising:

scanning a source data container for generating a cloned copy of a portion of the source data container; wherein the portion of the source data container includes a compressed block that is compressed using a non-variable compression group size and at least one block that is not within the non-variable compression group size;

reading the compressed block from the source data container without having to de-compress the compressed block; and generating the cloned copy of the portion of the source data container with the at least one block and the compressed block compressed using the non-variable compression group size.

7. The method of claim 6, wherein the at least one block is compressed before being stored with the cloned copy of the portion of the source data container.

8. The method of claim 6, wherein the source data container is stored in a hierarchical structure by a processor executable storage operating system.

9. The method of claim 8, wherein the hierarchical structure includes a first data structure identifying the source data container, a second data structure associated with the first data structure, the second data structure storing address pointers to a third data structure that stores block numbers associated with physical storage space of a storage device.

10. The method of claim 6, wherein the non-variable compression group size is at least eight blocks.

11. A non-transitory, machine readable storage medium having stored thereon instructions for performing a method for partially cloning a data container, comprising machine executable code which when executed by at least one machine, causes the machine to:

determine a compressed block compressed using a non-variable compression group size;

clone the compressed block using the non-variable compression group size without having to de-compress the compressed block;

de-compress a block of the data container that is outside the non-variable compression group size; and storing the cloned compressed block and the decompressed block that is not within the non-variable compression group size as a partially cloned portion of the data container.

12. The storage medium of claim 11, wherein the de-compressed block is compressed before being stored as part of the partially cloned portion of the data container.

13. The storage medium of claim 11, wherein the data container is stored in a hierarchical structure by a processor executable storage operating system.

14. The storage medium of claim 13, wherein the hierarchical structure includes a first data structure identifying the data container, a second data structure associated with the first data structure, the second data structure storing address pointers to a third data structure that stores block numbers associated with physical storage space of a storage device.

15. The storage medium of claim 11, wherein the non-variable compression group size is at least eight blocks.

16. A system, comprising:

a memory containing machine readable medium comprising machine executable code having stored thereon instructions; and a processor module coupled to the memory, the processor module configured to execute the machine executable code to:

determine a compressed block compressed using a non-variable compression group size;

clone the compressed block using the non-variable compression group size without having to de-compress the compressed block;

de-compress a block of the data container that is outside the non-variable compression group size; and storing the cloned compressed block and the decompressed block that is not within the non-variable compression group size as a partially cloned portion of the data container.

17. The system of claim 16, wherein the de-compressed block is compressed before being stored as part of the partially cloned portion of the data container.

18. The system of claim 16, wherein the data container is stored in a hierarchical structure by a processor executable storage operating system.

19. The system of claim 18, wherein the hierarchical structure includes a first data structure identifying the data container, a second data structure associated with the first data structure, the second data structure storing address pointers to a third data structure that stores block numbers associated with physical storage space of a storage device.

20. The system of claim 16, wherein the non-variable compression group size is at least eight blocks.

* * * * *